W. M. CHRISTOPHER.
CLEAR VISION DEVICE FOR WINDSHIELDS.
APPLICATION FILED NOV. 11, 1920.
1,396,729.
Patented Nov. 15, 1921.
2 SHEETS—SHEET 1.
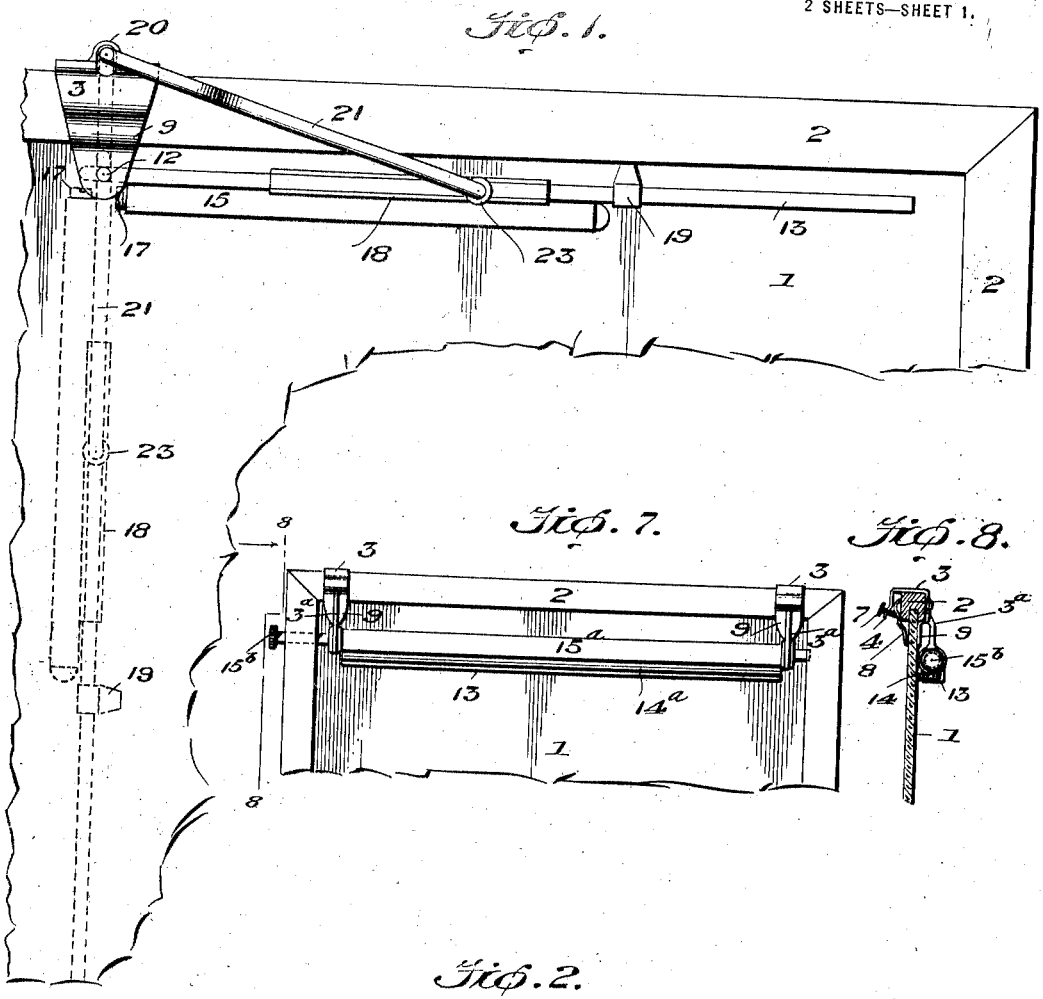
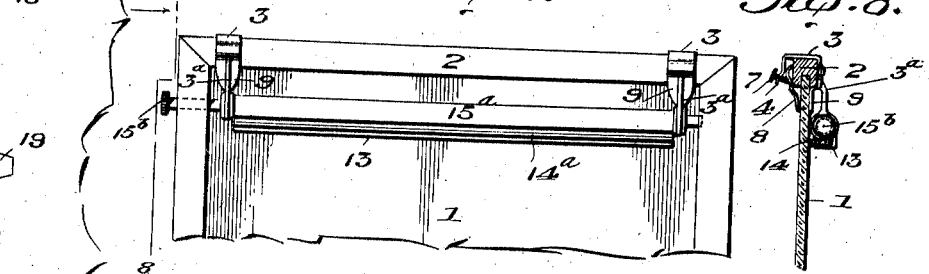
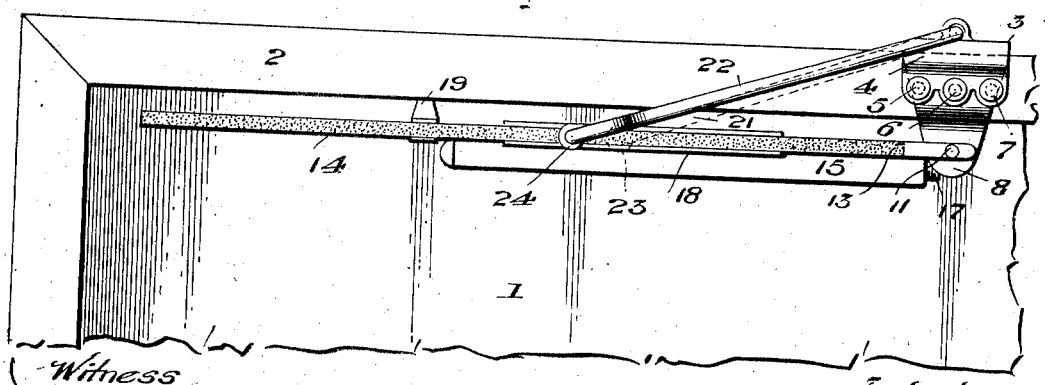
Witness
Inventor
William M. Christopher
Attorney W. M. CHRISTOPHER.
CLEAR VISION DEVICE FOR WINDSHIELDS.
APPLICATION FILED NOV. 11, 1920.
1,396,729.
Patented Nov. 15, 1921.
2 SHEETS—SHEET 2.
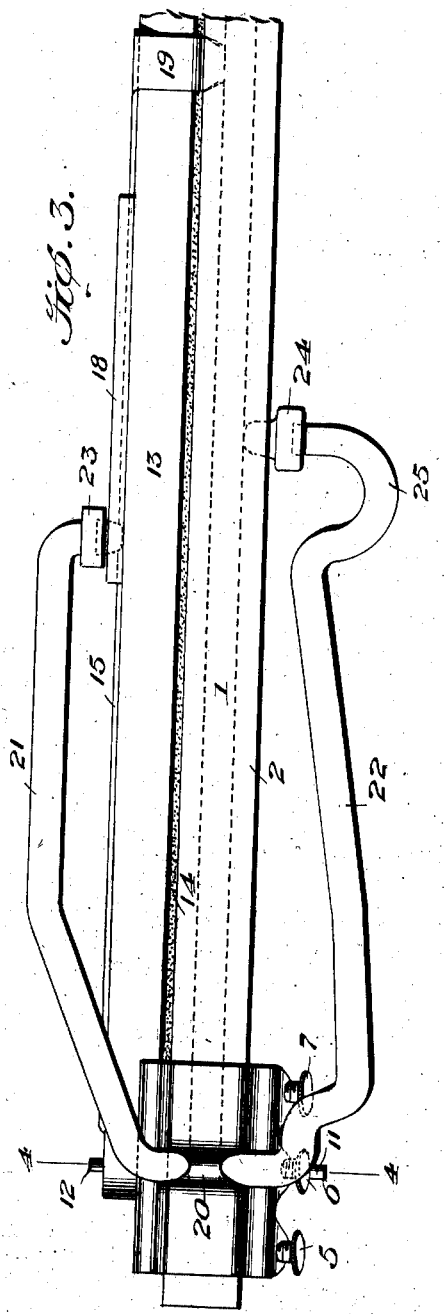
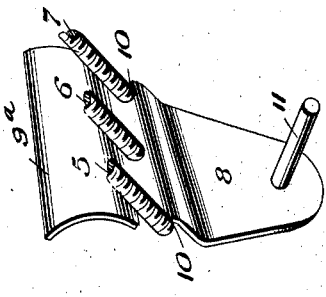
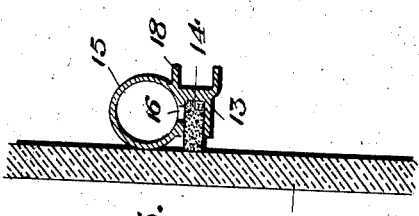
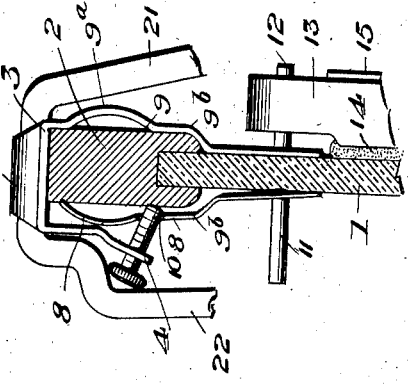
Witness
Inventor
William M. Christopher
by
Attorney

UNITED STATES PATENT OFFICE.

WILLIAM M. CHRISTOPHER, OF TONAWANDA, NEW YORK.

CLEAR-VISION DEVICE FOR WINDSHIELDS.

1,396,729.  Specification of Letters Patent.  Patented Nov. 15, 1921.

Application filed November 11, 1920. Serial No. 423,296.

*To all whom it may concern:*

Be it known that I, WILLIAM M. CHRISTOPHER, a citizen of the United States, residing at Tonawanda, in the county of Erie and State of New York, have invented certain new and useful Improvements in Clear-Vision Devices for Windshields, of which the following is a specification.

This invention relates to an improved clear vision device for the wind-shields of automobiles, and has for its objects the provision of, first, a universal clamp for the attachment of the device to the frame of any one of the wind-shields now in common use on standard makes of cars; second, a novel reservoir or automatic liquid feeder combined with a wick by which any suitable liquid or powder adapted for preventing rain or sleet from adhering to the glass will be automatically fed to the wick when the clear vision device is arranged for feeding and wherein the feed will be cut off when the device is properly set; third, a clear vision device of improved construction arranged and adapted for the use of cleaning means on either, or both, sides of the glass, as may be preferred; fourth, a clear vision device comprising the combination of a clamp for holding it on the frame of the wind-shield, a wick, a fountain or reservoir for feeding liquid or powder to the wick or wiper, and other improved means for holding the wick in any position in which it may be set.

The invention is susceptible of modification without departing from the essential principles thereof and the disclosure in the accompanying drawings and description hereinafter given are by way of illustration, and not in limitation, of the invention.

In the accompanying drawings—

Figure 1 is an elevation looking toward the outside of a wind-shield, of which a portion is shown, my clear vision device being shown in full lines in raised position and in dotted lines in lowered position;

Fig. 2 is an elevation looking toward the inside of the wind-shield, the device being in raised or horizontal position;

Fig. 3 is an enlarged plan view, partly broken away;

Fig. 4 is a section on line 4—4 of Fig. 3;

Fig. 5 is a detail section through the reservoir and the wick and holder for the latter when in feeding position;

Fig. 6 is a detail perspective of the spring leaf of the clamp, there being shown parts of the screws.

Fig. 7 is an elevation of a modification, looking toward the outside of a wind-shield; and Fig. 8 a section on line 8—8, Fig. 7.

My invention is not only a wiper but it is a cleaner, as it is provided with means for supplying a liquid to the felt or wick for the purpose of coating the wind-shield to prevent rain and sleet from adhering. Any suitable liquid may be used for that purpose. The glass of a wind-shield appears at 1 and the frame at 2. Different cars have different wind-shields, particularly the cross sectional shape of the frame 2. My invention embodies a clamp which I term "universal" because of its adaptability to the cross-sectional shapes of substantially all of the wind-shields used on the standard makes of automobiles, thus enabling my clear vision device to be readily applied to practically any wind-shield.

The clamp comprises a yoke 3 which is adapted to straddle the frame 2 and is provided one side with an offset or inclined part 4 carrying three adjusting thumb-screws 5, 6, 7, the two outer ones of which are adapted to bear directly on the frame 2 as shown in Figs. 2 and 4, and the intermediate screw 6 is designed to bear upon, and tension, a resilient or spring clamp plate 8 which is shown separately in Fig. 6. The clamp plate 8 and the side of the clamp 3 which lies on the other side of the frame 2 and is shown at 9 are of substantially the same shape. The side 9 is not intended to have resiliency but may possess a limited amount of springiness. The clamp plate 8 has notches 10 through which the tips of the screws 5 and 7 pass so that they may bear on the frame 2. The intermediate screw 6 bears on the central portion of the resilient clamp plate 8. Consequently screws 5 and 7 hold the clamp 3 securely and the screw 6 by exerting a proper pressure on the plate 8 causes the entire clamp to properly conform to whatever may be the cross-sectional shape of the frame 2. The side 9 of the clamp and the plate 8 each have a bowed part 9ª and a rounded part 9ᵇ. These shapes in conjunction with the width of the top of the clamp 3, enable the clamp to be suitably secured to any wind-shield frame. The plate 8 has a stud 11, and side 9ª a similar pin or stud 12. The studs 11 and 12 enable one or two cleaners to be applied to the clamp and used on one or both sides of the wind-shield, as may be desired. Under ordinary conditions it is only necessary to employ one cleaner, located on the outside of the wind-shield, as shown in the drawings. The lower ends of the plate 8 and side 9 extend downwardly and bear on the glass 1 so that the cleaner is hung below the frame 2.

The cleaner has an elongated holder 13 which is of channel form, its upper end being pivoted on the pin or stud 12. A wiper or wick 14 is secured in the channel of the holder 13, and has its edge projecting therefrom and bearing on the glass 1. The holder 13 and wiper or wick 14 may be of such length as will adapt them to the narrowest wind-shield to which the device would be applied. If desired, the holder 13 and wick 14 may be of a length corresponding to the greatest width of wind-shield to which the device would be applied, and they may be cut off to fit the narrower widths of wind-shields. Both forms of the invention are to be considered as claimed.

Suitably secured to the holder 13, as by brazing, for instance, or formed integral therewith, is an elongated tubular fountain or reservoir 15 which has an elongated slot 16 (Fig. 5) extending substantially its full width for the purpose of allowing liquid to pass from the reservoir to the wick or wiper 14. The reservoir 15 is closed except for one end which is provided with a closure in the form of a screw plug 17 (Figs. 1, 2 and 3). On removing this plug, the liquid may be introduced into the reservoir 15 and the latter then closed. Feeding of the fluid to the wick or wiper 14 will only occur when the device is lowered from the horizontal position shown in full lines in Figs. 1 and 2 to the dotted line position of Fig. 1 or arranged with the reservoir uppermost, as in Fig. 5. Consequently there will be no flowing of the liquid under ordinary conditions.

Secured to the back of the holder 13 is a guide 18. The holder 13 carries a spring clip 19 which constitutes a stop as it is adapted to abut the horizontal part of the frame 2 when the device is in raised position, as shown in Figs. 1 and 2.

Hinged or journaled at 20 in the top of the clamp 3 is a duplex pressure device comprising arms 21 and 22, the former being provided with a button 23 which has its tip received in the guide 18. The arm 22 is provided with a button 24 which bears on glass 1. The springiness and pressure of the arms 21 and 22 hold the wiper 14 firmly against the glass 1.

If it is desired to use a second clear vision device, on the inside of the glass 1, it will be hung from the pin 11 and the button 24 will be received in a guide on said second clear vision device corresponding to the guide 18.

The screws 5, 6, 7 enable the clamp to be positioned at any point desired on the frame 2. Normally the device is disposed as shown in full lines in Figs. 1 and 2. When it is desired to operate the clear vision device, the driver grasps the bowed part 25 of the arm 22 and swings said arm downwardly to the dotted line position of Fig. 1. This action disposes the reservoir 15 in feeding position and it then automatically delivers fluid to the wick or wiper 14 and the latter applies the same to the glass 1, forming a coating thereon which will prevent rain or sleet from adhering for some time.

It is within the spirit of my invention to arrange the device horizontally as shown by full lines in Figs. 1 and 2 but with the reservoir uppermost, in the feeding position shown in Fig. 5. When this is done, the wick 14 continues to feed the liquid to the glass 1 and if a liquid be used such as will prevent rain from adhering to the glass, the rain will mix with liquid and spread all over the wind shield, keeping the latter in "clear-vision" condition without necessitating any swinging movement of the device.

The modification shown in Figs. 7 and 8 is adapted to carry out the idea of a non-swinging, horizontally, clear-vision device which may be set to feed the liquid, or in non-feeding position, at will.

The clamps 3 are of the construction heretofore described but are provided with brackets 3ª. The tubular reservoir 15ª is frictionally journaled in the brackets 3ª so as to be adapted to be turned on its longitudinal axis, to bring the wick 14ª against the glass 1 and below the reservoir 15ª so that the liquid therein will automatically feed to the wick 14ª and be applied to the glass, or, to be turned backward to dispose the wick in non-feeding position. A finger knob 15ª is provided to enable the device to be turned in the manner just explained.

What I claim is:

1. In a clear vision device for windshields, the combination with a pivotally mounted reservoir and a wick carried thereby which is fed by the reservoir, of means for attaching the device to a windshield, said reservoir and wick being arranged so that the reservoir will be in non-feeding position when turned one way and in feeding position when turned another way.

2. In a clear vision device for wind-shields, the combination with a clamp adapted to engage the edge or frame of the wind-shield of an absorbent wick pivotally connected to said clamp, a reservoir movable with the wick and adapted for feeding it, and means coöperating with the clamp and said wick for holding the wick in contact with the wind-shield.

3. In a clear vision device for wind-shields, the combination with a clamp adapted to engage the edge or frame of the wind-shield, of an absorbent wick pivotally connected to said clamp, a reservoir movable with the wick and adapted for feeding it, and means coöperating with the clamp and said wick for holding the wick in contact with the wind-shield comprising a double armed pressure rod hinged to the clamp and having one arm coöperating with the wick on one side of the wind-shield and the other arm engaged with the wind-shield on the opposite side thereof.

4. In a clear vision device for wind-shields, the combination with a clamp adapted to engage the edge or frame of the wind-shield, of an absorbent wick pivotally connected to said clamp, a reservoir movable with the wick and adapted for feeding it, and means coöperating with the clamp and said wick for holding the wick in contact with the wind-shield comprising a double-armed pressure rod hinged to the clamp and having one arm slidably engaged with the clear vision device on one side of the wind-shield and its other arm engaged with the wind-shield on the other side thereof.

5. In a clear vision device for wind-shields, an attaching clamp comprising a body having integral parts adapted to straddle the edge or frame of the wind-shield and having one of its sides adapted to bear on the wind-shield and its other side of shorter length, a spring leaf supplementing and completing the short side of the clamp, screws carried by the clamp adapted to engage the frame or edge of the wind-shield, and a screw carried by the shorter side of the clamp adapted to hold the spring leaf against the edge or frame of the wind-shield.

6. In a clear vision device for wind-shields, an attaching clamp comprising a body having integral parts adapted to straddle the edge or frame of the wind-shield and having one of its sides adapted to bear on the wind-shield and its other side of shorter length, the longer side of the clamp being provided with flat and with bowed parts to adapt it to different cross sectional shapes of wind-shield frames, the shorter side of the clamp being supplemented and completed by a separate spring leaf of the same general form as the longer side of the clamp, and means for securing the clamp to the wind-shield and for clamping the spring leaf against the wind-shield frame.

7. In a clear vision device for wind-shields, the combination with means for attaching the device to a wind-shield, of a reservoir, and an elongated absorbent wick carried by the reservoir and fed by the contents thereof, said wick being in contact with the wind-shield, said reservoir and wick being pivotally mounted for swinging into horizontal or upright position to dispose them in non-feeding or in feeding arrangement.

In testimony whereof I affix my signature.

WILLIAM M. CHRISTOPHER.

Witnesses:
 FRANK E. HOWARD,
 HAROLD C. ORTON.